May 10, 1966  C. FULOP  3,250,451
FASTENER RETAINING AND POSITIONING MUZZLE FOR
PISTON DRIVEN FASTENER INSERTING GUNS
Filed May 15, 1964  2 Sheets-Sheet 1
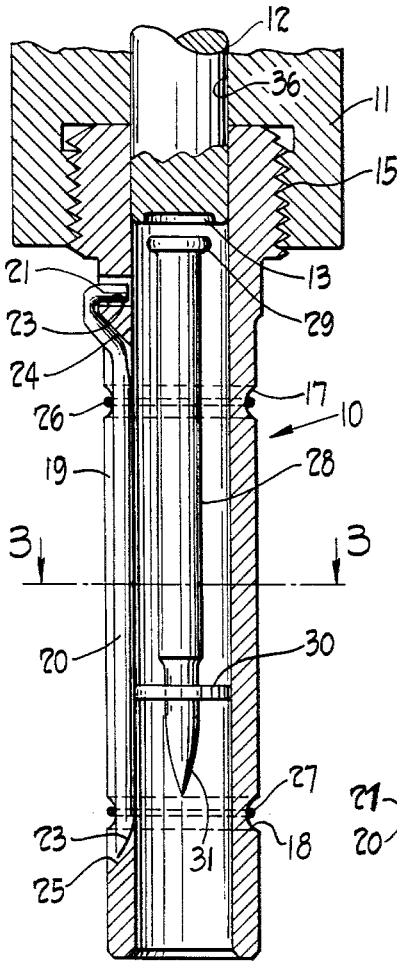
Fig. 1
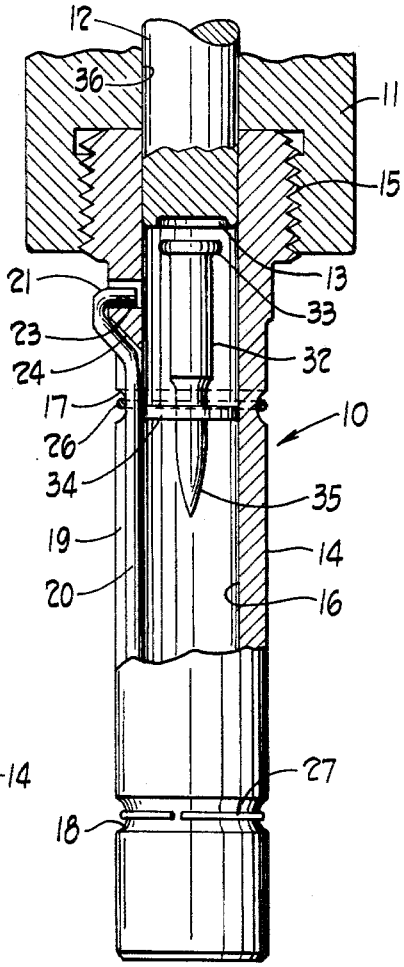
Fig. 2
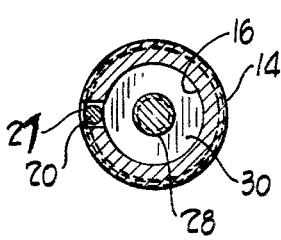
Fig. 3
Fig. 4
INVENTOR.
CHARLES FULOP
BY
ATTORNEY.

May 10, 1966 C. FULOP 3,250,451
FASTENER RETAINING AND POSITIONING MUZZLE FOR
PISTON DRIVEN FASTENER INSERTING GUNS
Filed May 15, 1964 2 Sheets-Sheet 2

INVENTOR.
CHARLES FULOP
BY
ATTORNEY.

United States Patent Office 3,250,451
Patented May 10, 1966

3,250,451
FASTENER RETAINING AND POSITIONING
MUZZLE FOR PISTON DRIVEN FASTENER
INSERTING GUNS
Charles Fulop, 131 Skyview Drive,
Seven Hills Village, Ohio
Filed May 15, 1964, Ser. No. 367,747
2 Claims. (Cl. 227—149)

This invention relates to piston driven fastener inserting guns, and particularly to a fastener retaining and positioning muzzle for such guns.

Conductive to a better understanding of the invention it may be well to point out that explosively acutated fastener driving guns wherein the reactive force of an exploded gun-powder cartridge is used to actuate a driving member, or rod, which, in turn, drives a fastener are commonly used to instantaneously drive studs, bolts, pins and other fastening, connecting or joining means, into concrete, steel or any other substance or material and imbed therein said fastening devices with instant efficiency, without requiring any previous time-consuming work such as drilling, chiseling, anchoring, threading and the like, permitting thus a significant reduction in labor costs.

Such guns have a muzzle bore in which the fastener is inserted and temporarily retained, and through which the driving member, or hammer rod, travels in driving the fastener home.

Since the muzzle bore must be held downward, in a vertical plane, to position and drive the fastener into a horizontal surface, means must be provided to temporarily hold the fastener in the muzzle proximate the driving rod while it is beng positioned against the surface into which it is about to be driven.

The fasteners, or pins, commonly used are made of treated steel and comprise extremely hard tips, or points, shanks of various lengths, and cylindrical or flat heads. The shank of such fasteners are provided with a guide ring made of a thin centrally perforated metal disc, set or slidably mounted on the shank so as to locate the shank point in centered position within the muzzle bore.

However, with gun muzzles as presently constructed, a second disc made of plastic material and of slightly larger diameter than the metal is fitted on the shank against the metal disc, and acts to frictionally engage the bore wall of the muzzle in a snug fit to retain the fastener therein, when the mouth of the muzzle is pointed downward.

The plastic disc, being relatively soft, will not score or jam against the bore wall as the fastener is driven forward along the bore by the action of the gun driving rod.

The cost of manufacturing these plastic retaining discs, and the labor required to mount them on the otherwise completed fasteners, materially increases the price of such fasteners, in a highly competitive market.

The primary object of this invention, therefore, is to provide a fastener retaining and positoning muzzle for piston driven fastener inserting guns, that can be used with pin fasteners of the type having metal centering discs, between the head and point ends thereof, that will directly engage the peripheral edge of the metal guide disc and retain said fasteners with their point ends centered therein, without requiring the presence of a supplementary cushioning disc between the periphery of the metal disc and the muzzle bore wall.

Another object is to provide a gun muzzle of the type stated that accommodate and precisely center such fastener pins, whether they be long or short.

A further object is to provide such a gun muzzle that will temporarily retain such fasteners therein, without offering any opposition to the movement of the fastener driving rod therethrough, at the time of its activation.

Other objects are to provide a gun muzzle of the type stated that is simple to use, rugged in construction, and reliable in operation.

The invention will be best understood by a reference to the accompanying drawing which forms a part of this specification, and in which, FIGURE 1 is a longitudinal sectional view of the gun muzzle that is the subject of this invention, showing a long pin fastener retained and positioned therein as it appears immediately prior to the activation of the fastener inserting gun, only a part of which is illustrated;

FIGURE 2 is a fragmentary longitudinal view of the muzzle illustrated in FIGURE 1, showing a short pin fastener retained therein;

FIGURE 3 is a cross sectional view taken along the line and in the direction of the arrows 3—3 of FIGURE 1;

FIGURE 4 is a sectional view similar to FIGURE 3, showing the relation of the parts when a fastener is not being retained in the muzzle bore;

Figure 5:
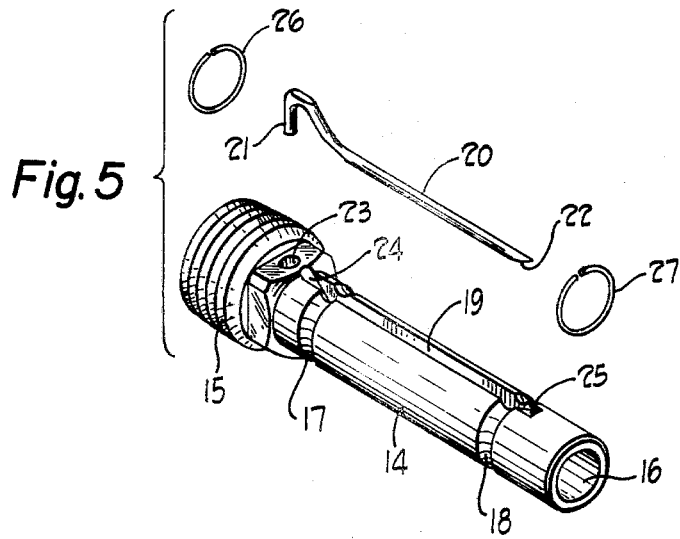
FIGURE 5 is an exploded view of the gun muzzle.

Referring more particularly to the drawing, there is seen in FIGURES 1 and 2 the fastener retaining and positioning muzzle for use with a piston driven fastener inserting gun, broadly indicated by reference numeral 10.

The muzzle 10 has a barrel portion 14 with an externally threaded head portion 15 formed integral therewith.

Reference numeral 16 indicates an axial bore extending through the barrel and head, and which is of the same diameter as the bore 36 of the gun 11, shown only part, and which is of the conventional type, and therefore will not be described in detail, since it forms no part of this invention.

The gun 11 has a driving rod 12 activated by means of a powder cartridge reacting against a piston of which the rod 12 is a continuation.

The muzzle is mounted on the end of the gun 11 through its threaded head 15, as illustrated, with the muzzle bore 16 aligned with and forming a continuation of the gun bore 36, in which the driving rod 12 is held. The rod 12 is free to travel through both bores 36 and 16 upon activation by a powder charge.

The barrel 14 has a longitudinally extending radial slot 19 cut through the wall thereof, having terminal seats 24 and 25 at either end thereof.

Reference numeral 23 indicates a bore in the barrel 14 adjacent the upper seat 24 and perpendicular to the axial bore 16.

Reference numeral 20 indicates a rigid, non-flexible, keeper, adapted to loosely fit into the slot 19 with one end 22 shaped to rest on the seat 25 and the other end bent upon itself to rest on the seat 24 with a stud 21 fitted in the lateral bore 23, as is most clearly seen in FIGURES 1 and 2. Two circular grooves 17 and 18 are cut in the outer surface of the barrel 14, adjacent the seats 24 and 25, respectively, which intersect the slot 19, as shown in FIGURE 5.

Spring-wire rings 26 and 27 are seated in the grooves 17 and 18, respectively, in pressed engagement with the keeper 20, as is most clearly shown in FIGURE 1.

The spring rings 26 and 27 act to normally bias the keeper 20 against the seats 24 and 25, to a first position, wherein the keeper edge protrudes beyond the inner face of the wall of the axial bore 16, as seen in FIGURE 4, in enlarged form.

In practice, to be effective, the keeper 20 need only protrude into the bore 16 about 0.010 inch.

The keeper is free to be moved against the biasing action of the springs 26 and 27, to a second position in the slot 19, spaced from the seats 24 and 25, by pressure exerted against the keeper by an object in the bore 16, such as the fastener centering disc 30 or the driving rod 36, in which position the inner edge of the keeper 20 is flush with the wall of the axial bore 16, as seen in FIGURE 3.

Figure 6:
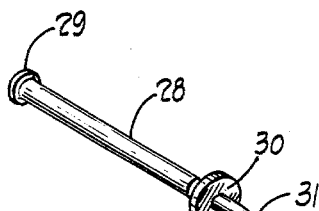
FIGURE 6 is a perspective view of the pin type fastener which this muzzle is intended to retain; and, FIGURE 7 is a side view, partly in section, of an alternate type of fastener retaining and positioning gun muzzle.

FIGURE 6 shows one of the pin type fasteners 28 intended to be inserted by the use of the gun muzzle that is the subject of this invention.

The pin 28 is made of heat treated steel having a shank, an extremely hard point 31, a head 29 and a guide ring, or centering disc, 30 mounted on the shank between the head and point ends, proximate the point end 31.

The diameter of the disc 30 is such that it will fit the muzzle bore 16 in a freely sliding fit.

When the pin 28 is driven into place the disc rests against the surface of the object in which the pin is being inserted, and is moved up against the head end 29 to serve as a head washer of larger diameter than the head 29, and in fact becomes a part of the head.

In use the pin 28 is inserted into the muzzle bore 16 with its head 29 close to the driving end of the rod 12, as seen in FIGURE 1.

At the same time the spring pressed keeper 20, in its first position, presses against the peripheral edge of the centering disc 30, which acts to move the keeper toward its second position, as seen in FIGURES 1 and 3, which reacts to frictionally hold the pin in the bore against unintentional removal.

Now, the muzzle bore can be held at any angle, or even straight down, without danger of the pin falling out.

However, under impact from the driving rod 12, the fastener is free to be driven out of the muzzle bore, since the biasing action of the springs 26 and 27 is not great enough to hold the disc back.

Furthermore, the keeper will offer no resistance to the movement of the driving rod 12 through the bore 16, since the rod 12 will push the keeper back in its slot 19, to its second position, flush with the bore wall. Immediately after the withdrawal of the rod 12, the keeper will return to its normal first position, ready to retain another fastener therein for positioning in the bore 16, preparatory to insertion.

Since the keeper 20 extends longitudinally of the muzzle bore 16, it will effectively retain short pins 32, as shown in FIGURE 2, as well as the long pin 28 shown in FIGURE 1.

Since the keeper 20 extends the length of the bore 16, to a point proximate the mouth thereof, it will maintain contact with disc 34 of the pin 32, as the pin is moved along the bore by the driving action of the rod 12, to hold the point end 35 thereof centered in the bore 16, for accurate insertion.

Figure 7:
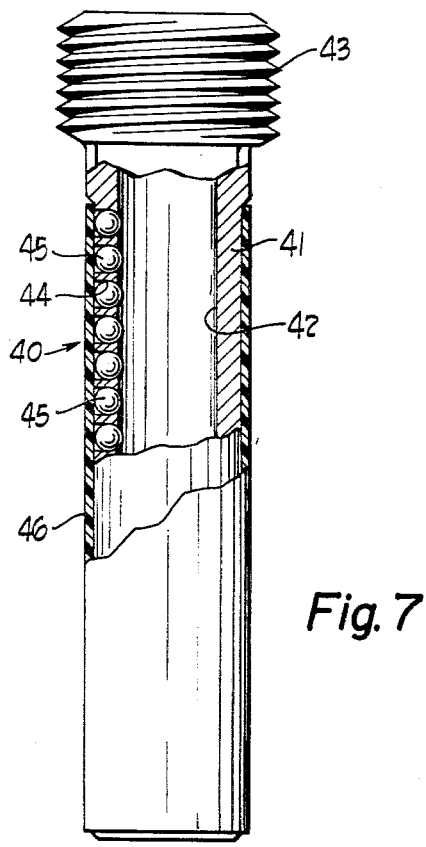

FIGURE 7 illustrates an alternate type of muzzle construction, broadly indicated by reference numeral 40, having a plurality of steel ball keepers 45, instead of the single keeper 20, used in the type 10 muzzle.

The unit 40 comprises a barrel 41 having a threaded head 43 adapted to be screwed into the gun 11 of FIGURE 1 instead of the unit 10 shown.

The barrel 41 has an axial bore 42 therethrough.

Reference numerals 45 indicate a plurality of solid steel keeper balls whose diameters are larger than the width of the barrel wall adjacent the bore 42.

The keeper balls 45 are nested in sockets 44, formed in the barrel wall, with seats at their inner ends having centered orifices therethrough which open to the bore 42.

The sockets 44 are closely spaced, and, as illustrated, are aligned the length of the bore 42. It is of course to be understood that they could be aligned in a spiral path, as well as the straight line arrangement shown. The main objective being to have grouped keepers form a practically continuous surface to anything positioned in the bore 42.

When in a first position, resting on the socket seats the peripheral edge of each keeper ball 45 extends through the seat orifice into the bore 42 beyond the face of the wall thereof. At the same time the peripheral edge of the balls also extend slightly beyond the outer surface of the barrel 41.

An elastic sleeve 46, fabricated from a suitable plastic material, such as nylon, is snugly fitted over the outside of the barrel 41, covering and engaging the peripheral edges of all the keeper balls 45 to normally bias them to their first positions, as illustrated in FIGURE 7.

When a pin fastener of the type described hereinabove is inserted in the muzzle bore 42 the disc thereof moves the keeper balls 45, against the biasing action of the elastic sleeve 46, off their seats, to a second position, wherein the particular ball contacted acts to frictionally press against the disc and retain the pin in place in a manner similar to that of the keeper 20 of the muzzles illustrated in FIGURES 1 and 2.

Similarly, the keeper balls 45 offer no opposition to the travel of the driving rod through the bore 42, since, as the rod reaches each ball it moves the ball inwardly of its socket to its second position wherein its peripheral edge is flush with the wall of the bore 42.

Thus it will be apparent that the muzzles described provide metal to metal retention pressure to the pin discs, without danger of scoring or jamming the contacting surfaces, and without the need of costly auxiliary plastic cushioning discs, on the pins as heretofore required.

Although I have shown and described a preferred and alternate embodiment of my invention, it will be understood that certain parts and elements thereof may be replaced by mechanical equivalents without departing from the spirit of my invention. Consequently, I do not intend to be limited to the specific embodiments shown and described, but desire to be afforded the full scope of the following claims.

What I claim is:

1. In combination with a piston driven fastener inserting gun, having a driving rod, adapted for use with headed and pointed fasteners of the type having a centering disc positioned between the head and point ends thereof, a fastener retaining and positioning muzzle, comprising, a barrel adapted to be mounted at the driving rod end of the gun to form a continuation thereof; said barrel having an axial bore therethrough aligned with and adapted to receive the fastener driving rod therein for free movement therethrough, said driving rod being normally in a retracted position in said muzzle bore proximate the inner end thereof; the barrel also having a longtudinally extending radial slot in the wall thereof which intersects the axial bore; a seat located at either terminal of the slot; a rigid keeper loosely mounted in the slot, extending the length thereof with its ends supported by the terminal seats, and movable toward and away from said seats between a first position, wherein the keeper rests on the seats with its longitudinal edge protruding into the barrel bore beyond the face of the wall thereof, and a second position, wherein the keeper edge face is spaced from said seats and flush with said bore wall; and, spring means mounted on the barrel in engagement with the keeper to normally bias the keeper to its first position, wherein the keeper acts to frictionally press against the edge of the centering disc of a fastener of the above mentioned type, positioned in the bore with its head against the end of the driving rod, to temporarily retain said fastener therein prior to its being driven out of the muzzle by the movement of the driving rod therethrough, the keeper being movable, against the biasing action of the spring means, to its second position, flush with the bore wall, by the passage of the driving rod through the bore in driving the fastener home.

2. In combination with a piston driven fastener inserting gun, having a driving rod, adapted for use with headed and pointed fasteners of the type having a centering disc positioned between the head and point ends thereof, a fastener retaining and positioning muzzle, comprising, a barrel adapted to be mounted at the driving rod end of the gun to form a continuation thereof; said barrel having an axial bore therethrough aligned with and adopted to receive the fastener driving rod therein for free movement therethrough, said driving rod being normally in a retracted position in said muzzle bore, proximate the inner end thereof; the barrel having a plurality of closely spaced and aligned sockets in the wall thereof with seats at their inner ends, having apertures open to the axial bore, centered therein, a solid keeper ball, of larger diameter than the thickness of the barrel wall at the axial bore, positioned in each socket and moveable between a first position, wherein the keeper ball rests on the socket seat with its peripheral face protruding into the axial bore, and a second position, wherein the keeper ball is spaced from the socket seat with its peripheral face flush with the wall of the axial bore and protruding beyond the outer surface of the barrel; a sleeve of resilient material snugly fitted over the barrel and bearing against the peripheral surfaces of all the keeper balls when in both their first and second positions, and to normally bias all the balls to their first positions, wherein individual balls act to frictionally press against the edges of the centering disc of a fastener of the above-mentioned type positioned in the bore with its head against the end of the driving rod, to temporarily retain said fastener therein, prior to its being driven out of the muzzle bore by the movement of the driving rod therethrough, the keeper balls being moved to their second positions, flush with the bore wall, by the passage of the driving rod through the bore in driving the fastener home.

References Cited by the Examiner

UNITED STATES PATENTS

| 1,074,800 | 10/1913 | King | 227—149 XR |
| 1,820,081 | 8/1931 | Ludwig | 227—149 |
| 2,538,895 | 1/1951 | Brennan | 227—149 XR |
| 2,543,942 | 3/1951 | Shaff | 227—149 XR |
| 3,066,302 | 12/1962 | De Caro et al. | 227—10 |

FOREIGN PATENTS 1,096,723   2/1955   France.

GRANVILLE Y. CUSTER, JR., *Primary Examiner.*